United States Patent
Marko et al.

(10) Patent No.: US 11,631,104 B1
(45) Date of Patent: Apr. 18, 2023

(54) MANAGING A MULTI-MARKETPLACE CONTENT PRESENTATION USING A USER INTERFACE

(71) Applicant: Amazon Technologies, Inc., Seattle, WA (US)

(72) Inventors: Robert Joseph Marko, Excelsior, MN (US); Kara Alison Rosenberg Brass, New York, NY (US); Satyam Mehrotra, Seattle, WA (US); Kevin James Cafaro, Babylon, NY (US); Siddharth Srivastava, Redmond, WA (US); Bridget Preston, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/490,860

(22) Filed: Sep. 30, 2021

(51) Int. Cl.
  *G06Q 30/02* (2012.01)
  *G06Q 30/0242* (2023.01)
  *G06Q 30/0241* (2023.01)
  *G06F 40/40* (2020.01)
  *G06Q 30/0273* (2023.01)
  *G06F 3/0482* (2013.01)

(52) U.S. Cl.
  CPC ......... *G06Q 30/0243* (2013.01); *G06F 40/40* (2020.01); *G06Q 30/0249* (2013.01); *G06Q 30/0275* (2013.01); *G06F 3/0482* (2013.01)

(58) Field of Classification Search
  CPC .......... G06Q 30/0243; G06Q 30/0249; G06Q 30/0275; G06F 40/40; G06F 3/0482
  USPC ............. 705/14.41, 14.42, 14.48, 14.71
  See application file for complete search history.

(56) References Cited

U.S. PATENT DOCUMENTS

| | | | |
|---|---|---|---|
| 2007/0100811 A1* | 5/2007 | Error | G06Q 30/02 |
| 2021/0188304 A1* | 6/2021 | Baer | B60W 40/09 |
| 2022/0338160 A1* | 10/2022 | Greenwald | H04W 68/005 |

OTHER PUBLICATIONS

Pingpong, Top 5 Differences Between Selling On Amazon UK and Amazon US, Pingpongx.com [online], dated Oct. 24, 2019, retrieved from https://usa.pingpongx.com/us/blog/top-5-differences-between-selling-on-amazon-uk-and-amazon-usa/ on Dec. 3, 2022 (Year: 2019).*

(Continued)

*Primary Examiner* — Scott D Gartland
(74) *Attorney, Agent, or Firm* — Kilpatrick Townsend & Stockton LLP

(57) ABSTRACT

Techniques for managing a multi-marketplace content presentation are described herein. For example, a computer system indicates, via a graphical user interface at a device associated with an account identifier, multiple web sites that offer an item for which content is to be presented. The computer system receives input indicating a selection of a set of web sites of the multiple web sites. The computer system receives a first control and a first target associated with presenting the content in the set of web sites and generates a second control and a second target. The computer system indicates the item and a first metric associated with presenting the content in the web sites based on the first control and the first target. The computer system indicates the selected web site and a second metric associated with presenting the content in the selected web site.

20 Claims, 15 Drawing Sheets

(56) References Cited

OTHER PUBLICATIONS

Analysing SMS marketing performance and building campaigns (fast), SMS Edge [online], retrieved from Archive.org the WayBack Machine at https://web.archive.org/web/20210926032411/https://smsedge.com/academy/countries-performance-and-sms-campaigns on Dec. 3, 2022 (Year: 2021).*

Reporting, from Developers.Google.com [online], dated Nov. 8, 2019, retrieved from Archive.org, the WayBack Machine on Dec. 3, 2022 at https://web.archive.org/web/20191108043841/https://developers.google.com/google-ads/api/docs/reporting/overview (Year: 2019).*

* cited by examiner

MANAGING A MULTI-MARKETPLACE CONTENT PRESENTATION USING A USER INTERFACE

BACKGROUND

With many products being sold online, advertisers market products across web sites. Typically, an advertising campaign is specific to one web site or geographic region meaning that an advertiser sets up multiple similar campaigns to reach each desired web site or geographic region. Accordingly, assessing overall success of the similar campaigns is difficult.

BRIEF DESCRIPTION OF THE DRAWINGS

Various embodiments in accordance with the present disclosure will be described with reference to the drawings, in which.

DETAILED DESCRIPTION

Figure 1:
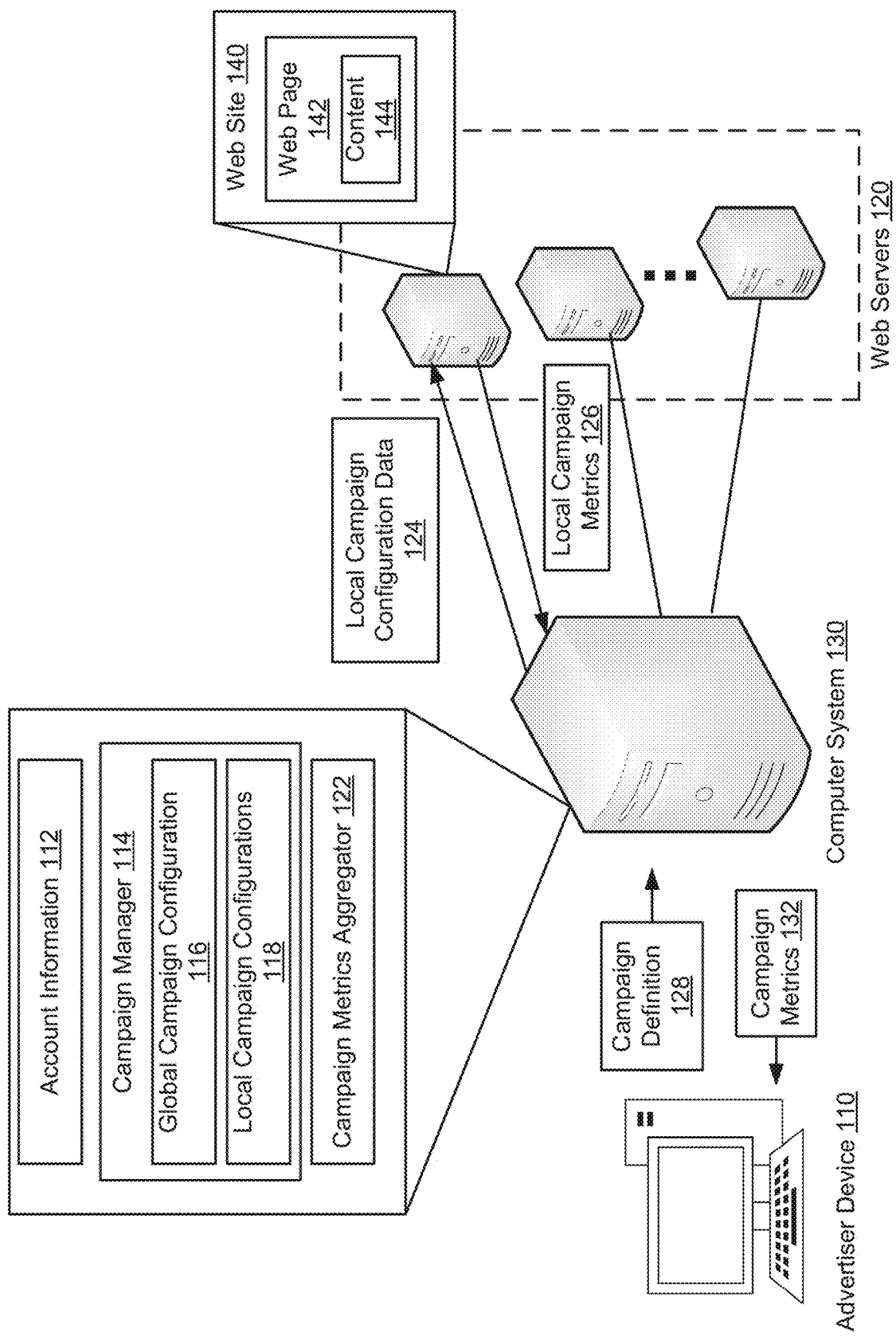
FIG. 1 illustrates an example of a system for managing a campaign of content, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, configuring and monitoring content presentation across multiple web sites or geographic regions. A computer system determines whether an item for which content is to be presented is offered at multiple web sites and indicates the multiple web sites to a user via a graphical user interface (GUI) at a device associated with an account identifier. The computer system receives input indicating a selection of a set of web sites of the web sites, a first control, and a first target associated with presenting the content in the set of web sites. The computer system then generates a second control based on the first control. The second control is a local control associated with presenting the content in a selected web site of the set of web sites. The computer system also generates a second target associated with presenting the content in the selected web site. The second target may be a translation of the first target in a language associated with the selected web site. The computer system indicates the selected web site or a geographic region associated with the selected web site, the second control, and the second target via the GUI. Additionally, the computer system indicates the item and a first metric associated with presenting the content in the web sites based at least in part on the first control and the first target. For the selected web site or geographic region, the computer system indicates a second metric associated with presenting the content in the selected web site based on the second control and the second target.

To illustrate, consider an advertising campaign associated with an advertiser account of an advertiser device. The advertiser device indicates an item for which content is to be presented. A computer system receives the indication and determines which web sites or geographic regions offer the item. The computer system indicates to the advertiser device which web sites or geographic regions offer the item and the advertiser device provides a selection of the web sites or geographic regions in which the content is to be presented. For example, the computer device can receive an indication that the advertising campaign is for the United States, Mexico, and Japan. The computer system then receives a budget for the campaign in US dollars and a keyword in English associated with the item. The computer system generates local budgets for each of the geographic regions in their respective currencies. Additionally, the computer system translates the keyword into Spanish and Japanese for use in their associated local campaigns. The computer system generates a global campaign configuration that includes an account identifier (ID) of the advertiser account, a campaign ID of the global campaign, a web site ID for each web site, the global budget, the keyword, the local budgets, and the translated keywords. A local configuration is created for each local campaign and sent to web servers associated with each of the geographic regions. The computer system receives local metrics from each web server about each of the local campaigns, aggregates the local metrics into global metrics, and indicates the local metrics and global metrics at the advertiser device. The advertiser can then monitor and manage the advertising campaign across the multiple web sites and geographic regions from the account at the advertiser device.

Embodiments of the present disclosure may provide technical improvements over conventional techniques for configuring and managing content presentation. For example, this process may be performed from a single GUI of a single application, without a user needing to access different GUIs of different applications for each web site or geographic region. Additionally, information about each campaign is available all together, allowing a user to make better-informed decisions about the campaign and future campaigns.

FIG. 1 illustrates an example of a system for managing a campaign of content, according to an embodiment of the present disclosure. As illustrated in FIG. 1, an advertiser device 110, which presents a graphical user interface (GUI), sends a campaign definition 128 to a computer system 130. In FIG. 1, the advertiser device 110 is illustrated as a desktop computer. Of course, the embodiments of the present disclosure similarly apply to other type of user devices including laptop computers, smartphones, etc. The advertiser device 110 is associated with an account identifier (ID) that is stored at the computer system 130 as part of account information 112. The account information 112 can also include items that are associated with the account ID, and marketplaces associated with each of the items. The campaign definition 128 includes content, such as an advertisement for an item, that is to be presented on one or more web sites. The web sites that the content is to be presented on may be included in the campaign definition 128, or the campaign definition 128 may indicate geographic regions the content is to be presented in. Each geographic region may be associated with a different web site. For simplicity, the term 'marketplace' may be used to refer to a web site that covers a particular geographic region. A marketplace may indicate the web site, the geographic region, or both. So, the campaign definition 128 can include an indication of one or more marketplaces in which the content is to be presented. The campaign definition 128 can also include controls and targets associated with presenting the content across all of the marketplaces and associated with each individual marketplace. The controls can be budgets associated with each marketplace and the overall campaign and the targets can be keywords or attributes associated with the item being presented in the content. A user may input the control and target for the overall presentation of the content across the marketplaces, and the computer system 130 may generate the controls and targets for each of the marketplaces from the input control and target.

The computer system 130 receives and processes the campaign definition 128. For example, a campaign manager 114 of the computer system 130 can generate configurations for presenting the content based on the campaign definition 128. The campaign manager 114 generates a global campaign configuration 116 that is associated with the overall campaign, and the campaign manager 114 generates local campaign configurations 118 for each marketplace in which the content is to be presented. The global campaign configuration 116 includes the account ID from the account information 112, a campaign ID, a web site ID of each web site associated with the marketplaces, and the control and the target for presenting the content across all of the marketplaces. Similarly, each of the local campaign configurations 118 includes the account ID, the campaign ID, the web site ID associated with the particular marketplace, and the control and target associated with presenting the content in the particular marketplace. Although a web site ID is illustrated here, other identifiers can be used, such as a marketplace ID or a geographical region ID. Generally, a web site ID, a marketplace ID, and a geographical region ID can be associated together such that a reference to one of the IDs can be used to determine the other IDs.

In an example, the computer system 130 sends local campaign configuration data 124 to web servers 120 that are each associated with a marketplace of one of the local campaign configurations 118. The computer system 130 sends the local campaign configuration data 124 via an application programming interface (API). The campaign definition 128 can indicate that the content is to be presented in marketplaces of the United States, Europe, and Japan, so there can be local campaign configurations 118 for each of the United States, Europe, and Japan. The computer system 130 sends local campaign configuration data 124 to web servers 120 associated with these marketplaces. For example, the local campaign configuration data 124 can be for content that is to be presented in the United States, so the computer system 130 sends the local campaign configuration data 124 to a web server associated with the United States. The local campaign configuration data 124 can include the account ID, the campaign ID, the web site ID of the marketplace, and the control and the target for the associated marketplace. The web servers 120 then present the content 144 in a web page 142 of a web site 140 associated with the marketplace.

The computer system 130 receives local campaign metrics 126 from each of the web servers 120 that present the content 144 via the API. The local campaign metrics 126 include performance metrics associated with presenting the content 144. For example, the local campaign metrics 126 can include a number of impressions, a return on advertising spend (ROAS), and other metrics associated with the presentation of the content 144. A campaign metrics aggregator 122 of the computer system 130 aggregates the local campaign metrics 126 from each of the marketplaces to generate global campaign metrics across all of the marketplaces. The campaign metrics aggregator 122 can add each of the local campaign metrics 126 from the different marketplaces together to generate the global campaign metrics.

The computer system 130 then sends campaign metrics 132 to the advertiser device 110 for presentation via the GUI. The campaign metrics 132 can include the global campaign metrics and the local campaign metrics 126. The campaign metrics 132 can be indicated at the GUI of the advertiser device 110. Additionally, the campaign, the item, and the marketplaces (or geographic regions) can be indicated at the GUI. Initially the global campaign metrics of the campaign metrics 132 can be indicated. Upon input from a user associated with the advertiser device 110, the local campaign metrics 126 for a particular marketplace may be indicated. For example, the user can select the United States and the GUI can then indicate the local campaign metrics 126 associated with the United States.

Figure 2:
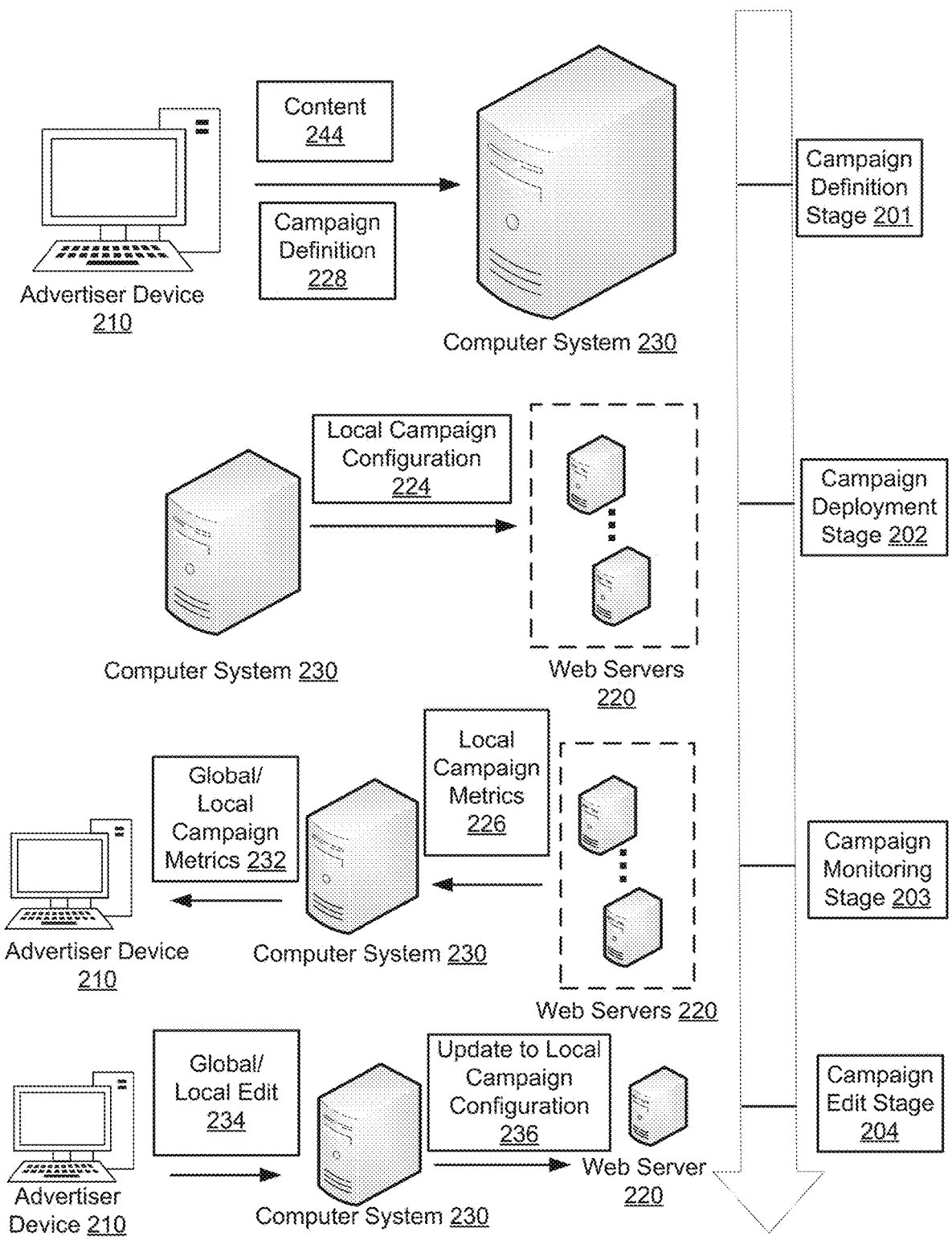
FIG. 2 illustrates an example of stages of managing a campaign of content presentation, according to embodiments of the present disclosure.

FIG. 2 illustrates an example of stages of managing a campaign of content presentation, according to embodiments of the present disclosure. As illustrated, the stages include a campaign definition stage 201, a campaign deployment stage 202, a campaign monitoring stage 203, and campaign edit stage 204.

In an example, during the campaign definition stage 201, an advertiser device 210 sends content 244 and a campaign definition 228 to a computer system 230, which is an example of the computer system 130 in FIG. 1. The content 244 indicates an item and associated advertisement that is to be presented in one or more marketplaces. The campaign definition 228 indicates the marketplaces, by either indicating marketplace IDs, web site IDs, geographic region IDs, or a combination thereof. A user may select the marketplaces from a list of marketplaces where the item is offered. Additionally, the campaign definition 228 includes a control, such as a budget or bid, associated with the presenting the content 244 and a target, such as a keyword or product attribute associated with the item. The user can provide the control and the target for the global campaign, which is the overall campaign across all selected marketplaces. The computer system 230 can generate a control and a target for each of the selected marketplaces based on the control and the target provided at the GUI of the advertiser device 210. For example, the user may indicate that the target is a keyword of "scary books" and that the content 244 is to be presented in the United States and Mexico. The computer system 230 translates the keyword into Spanish using a semantic matching similarity model (e.g., Bidirectional Encoder Representations from Transformers (BERT)) for presenting the content 244 in Mexico. Similarly, the computer system 230 can divide the control provided by the user across the marketplaces. The computer system 230 may evenly divide the control or unevenly divide the control based on the selected marketplaces, as further described FIG. 13.

During the campaign deployment stage 202, the computer system 230 sends the campaign to the selected marketplaces. To do this, the computer system 230 sends a local campaign configuration 224 to web servers 220 associated with the selected marketplaces. For example, a first web server of the web servers 220 can be associated with the United States and a second web server of the web servers 220 can be associated with Mexico. The local campaign configuration 224 includes an account ID associated with the advertiser device 210 that provided the content 244 and the campaign definition 228, a campaign ID of the campaign, a web site ID of where the content 244 is to be presented, and the local control and the local target for the associated marketplace.

During the campaign monitoring stage 203, the computer system 230 receives local campaign metrics 226 from each of the web servers 220. The local campaign metrics 226 can include performance metrics such as a number of sales, a number of impressions, an ROAS, etc. associated with presenting the content 244 in each of the marketplaces. The computer system 230 then sends global/local campaign metrics 232 to the advertiser device 210. A campaign metrics aggregator (e.g., the campaign metrics aggregator 122 in FIG. 1) of the computer system 230 can aggregate the local campaign metrics 226 from each of the web servers 220 to generate the global campaign metrics in the global/local campaign metrics 232. The advertiser device 210 indicates the global/local campaign metrics 232 via the GUI. Along with the global/local campaign metrics 232, the advertiser device 210 can indicate the marketplace(s), campaign, and item associated with each metric.

During the campaign edit stage 204, a global/local edit 234 to the campaign is received by the computer system 230 via the GUI of the advertiser device 210. A global edit can include at least one of an addition or removal of a geographic region (or marketplace) from the selected geographic regions (or marketplaces), an edit to the global control, or an edit to the global target. A local edit can include an edit to the local control or the local target for a geographic region or marketplace. If the computer system 230 receive a global edit, the computer system 230 can generate a change to a local campaign configuration based on the edit. The computer system 230 then sends an update to the local campaign configuration 236 to an associated web server 220 based on the edit. Accordingly, the web server 220 implements the update to the local campaign configuration 236 during the collection of subsequent metrics.

The GUI is an interface to a translation layer, such as program code of an application, to multiple marketplaces. The advertiser logs in to the application via the GUI and is able to access all of the application functionalities, rather than the advertiser needing to login and use different applications or platforms for each marketplace. The application, through the GUI, enables a one-stop platform for global and local functionalities, including translation of controls and targets to local marketplaces and translation of local metrics to global metrics in the native language of the advertiser. Since the application can allow the advertiser to manage multiple marketplaces through the GUI, the advertiser does not need to navigate between applications and platforms, so computation requirements of the advertiser device may be reduced.

Figure 3:
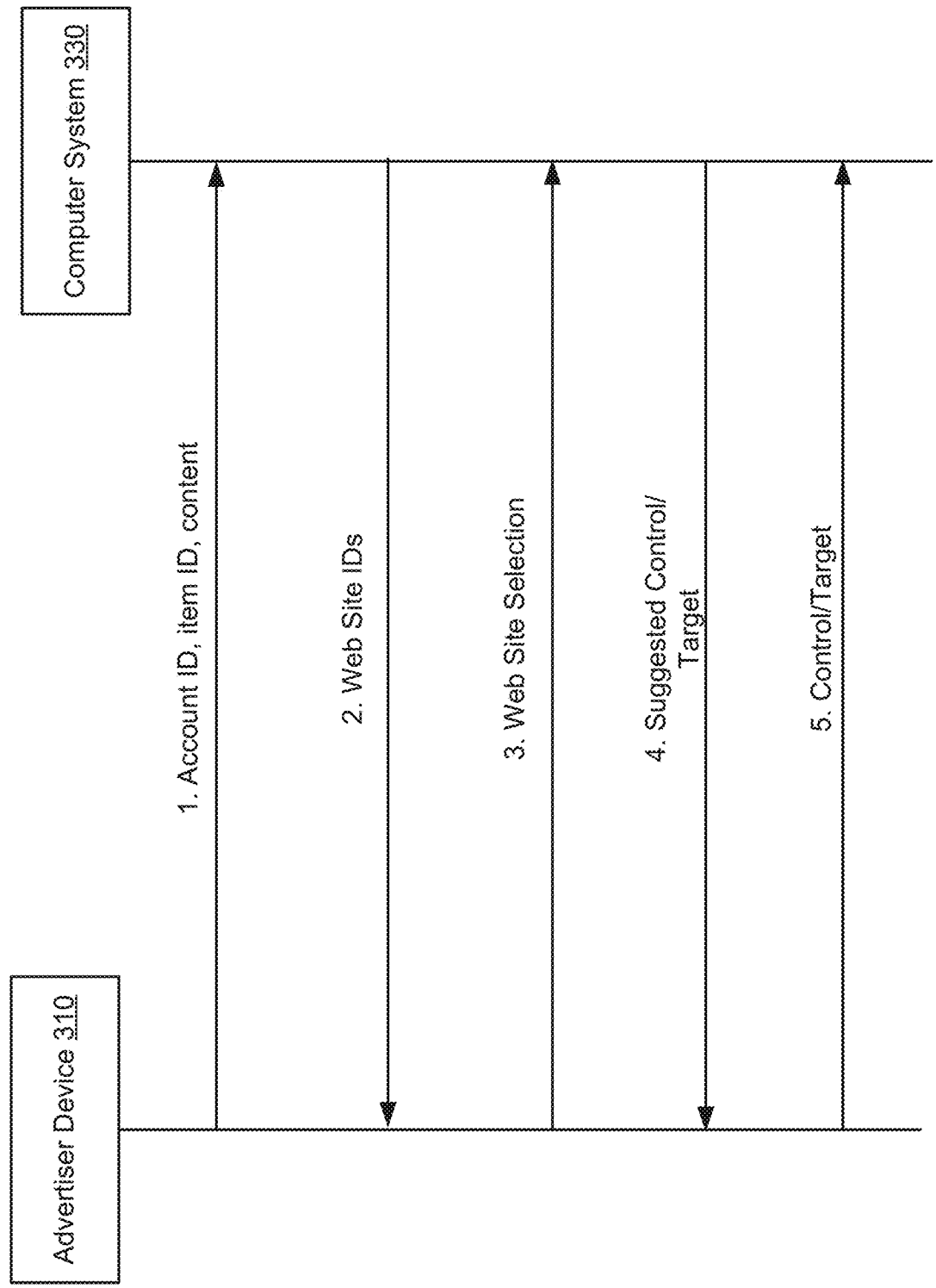
FIG. 3 illustrates an example a diagram for managing a campaign of content presentation between an advertiser device and a computer system, according to embodiments of the present disclosure.

FIG. 3 illustrates an example a diagram for managing a campaign of content presentation between an advertiser device 310 and a computer system 330, according to embodiments of the present disclosure. As illustrated with the first step, the advertiser device 310 sends an account ID, an item ID, and content to the computer system 330, which is an example of the computer system 130 in FIG. 1. The account ID is associated with an advertiser that operates the advertiser device 310. For example, the advertiser logs in to an advertising account, and the account ID is associated with the advertising account. The item ID uniquely identifies an item for which the content is to be presented, and the content is the advertisement associated with the item. In some instances, the advertiser device 310 may send multiple item IDs for multiple items to the computer system 330. The computer system 330 determines web sites (or marketplaces) in which each item is offered and unoffered. The computer system 330 then indicates web site IDs associated with each of the web sites are individually selectable along with the indication of which web sites offer the item as illustrated with the second step.

Upon receiving the indication, the advertiser device 310 sends a web site selection to the computer system 330 as illustrated with the third step. The web site selection indicates web site IDs of web sites in which the content is to be presented. The computer system 330 determines a suggested control/target for presenting the content as illustrated with the fourth step. The suggested target may be an item attribute defined based on an offer of the item at one of the selected web sites and corresponding item attributes of offers of the items on the other selected web sites. Additionally or alternatively, the suggested control may be a suggested bid for a keyword or item attribute. The suggested bid can be a global bid determined based on web traffic associated with the selected web sites and/or the selected bid may be for one web site and can be determined based on web traffic associated with the one web site. The advertiser device 310 sends a control/target to the computer system 330 to be associated with presenting the content. The control/target may be a selection from the suggested control/target from the computer system 330, or the advertiser device 310 may indicate an alternative control/target.

Figure 4:
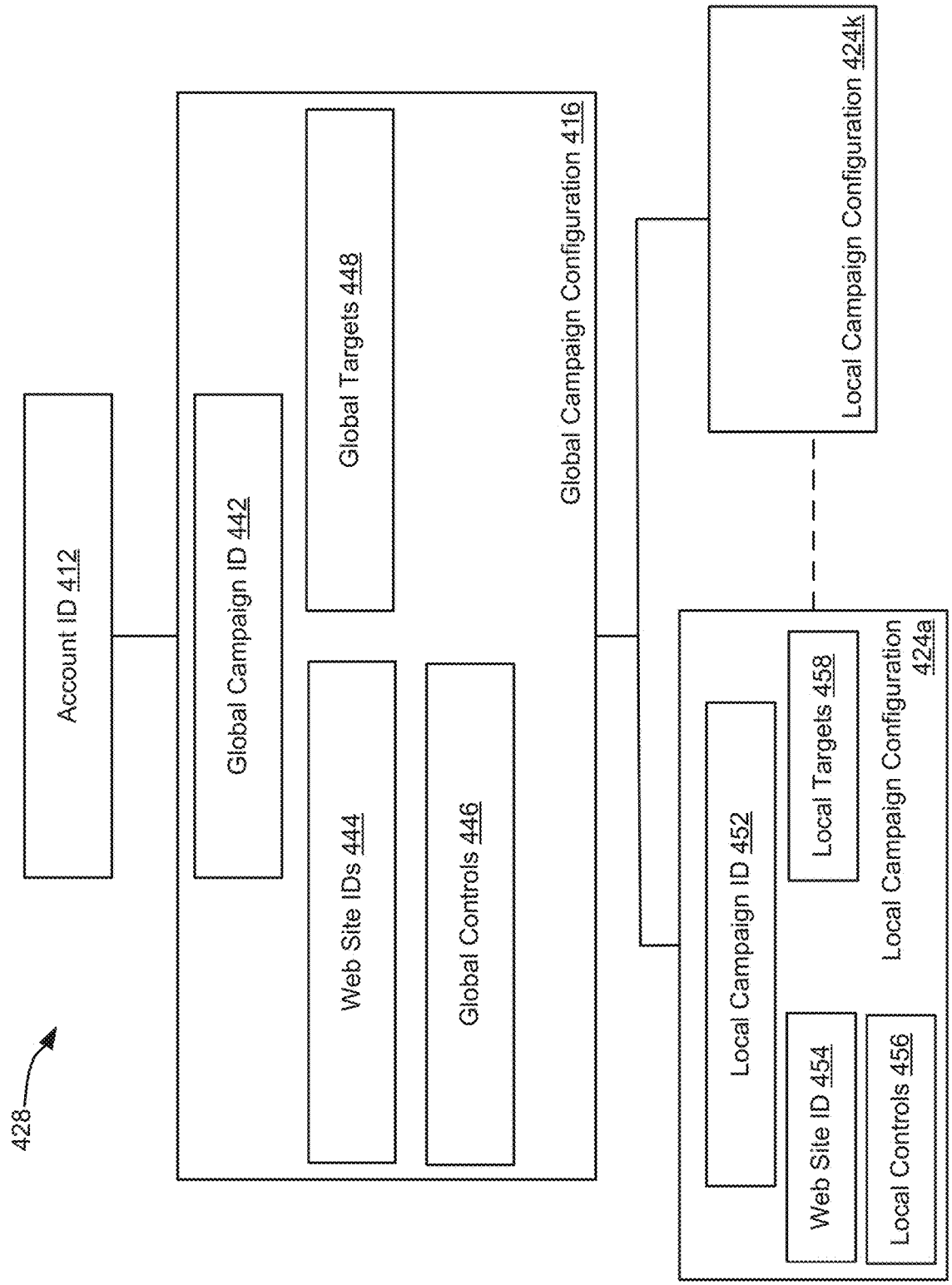
FIG. 4 illustrates an example of a hierarchy associated with a global campaign definition, according to an embodiment of the present disclosure.

FIG. 4 illustrates an example of a hierarchy associated with a global campaign definition 428, according to an embodiment of the present disclosure. The global campaign definition 428 can be an example of the campaign definition 128 in FIG. 1. The global campaign definition 428 is associated with and managed through an account ID 412 that is associated with an advertiser operating an advertiser device (e.g., advertiser device 110 in FIG. 1) to define the campaign and content that is to be presented. The account ID 412 is associated with one or more global campaign configurations, such as a global campaign configuration 416. The global campaign configuration 416 is associated with a particular item or content that is to be presented for the item. The global campaign configuration 416 incudes a global campaign ID 442, web site IDs 444, global controls 446, and global targets 448. The global campaign ID 442 uniquely identifies the global campaign and the web site IDs 444 uniquely identify web sites where the content of the global campaign is to be presented. The global controls 446 can include parameters for controlling the deployment of the global campaign. For instance, the global controls 446 can include a budget or bid for the global campaign. The global controls 446 can be generated or selected by a user of the advertiser device. In some examples, a computer system (e.g., computer system 130) may generate suggestions for the budget and the bid based on historical data, and the user can provide the selection from the suggestions. Additionally, each of the global controls 446 are in a first currency, such as the local currency of the advertiser's location (e.g., US dollars). The global targets 448 can include parameters for inserting content of the global campaign, such as a keyword or item attribute defined in a first language associated with a geographic region. For example, the global targets 448 may include a keyword of "computer charger".

For the global campaign configuration 416, there are associated local campaign configurations 424a-k, each of which corresponds to one of the web site IDs 444 (or marketplaces) defined in the global campaign configuration 416. The local campaign configuration 424a includes a local campaign ID 452, a web site ID 454, local controls 456, and local targets 458. The local campaign ID 452 uniquely identifies the local campaign configuration 424a-k. The web site ID 454 is one of the web site IDs 444 included in the global campaign configuration 424. For example, the web site ID 454 may be associated with a geographic region of the United Kingdom. The local controls 456 can be controls for the local campaign configuration 424a that are derived from the global controls 446. For example, if the global controls 446 include a global budget and a global bid, the local controls 456 can include a local budget and a local bid for presenting the content in the United Kingdom. The global controls 446 may be distributed evenly across the local campaign configurations 424a-k, or the local controls 456 for the local campaign configuration 424a may be determined based on a performance of the content presentation in the United Kingdom, a size of the marketplace, or a preference indicated by the user. Additionally, the local controls 456 are in a currency associated with the marketplace of the local campaign configuration 424a. The computer system can convert the currency from the global controls 446 to the currency for the local controls 456. The local targets 458 are similarly based on the global targets 448. For example, the local targets 458 may be the keywords or item attributes translated into a language associated with the marketplace of the local campaign configuration 424a. Each of the local campaign configurations 424a-k can include an associated web site ID, associated local controls, and associated local targets.

Figure 5:
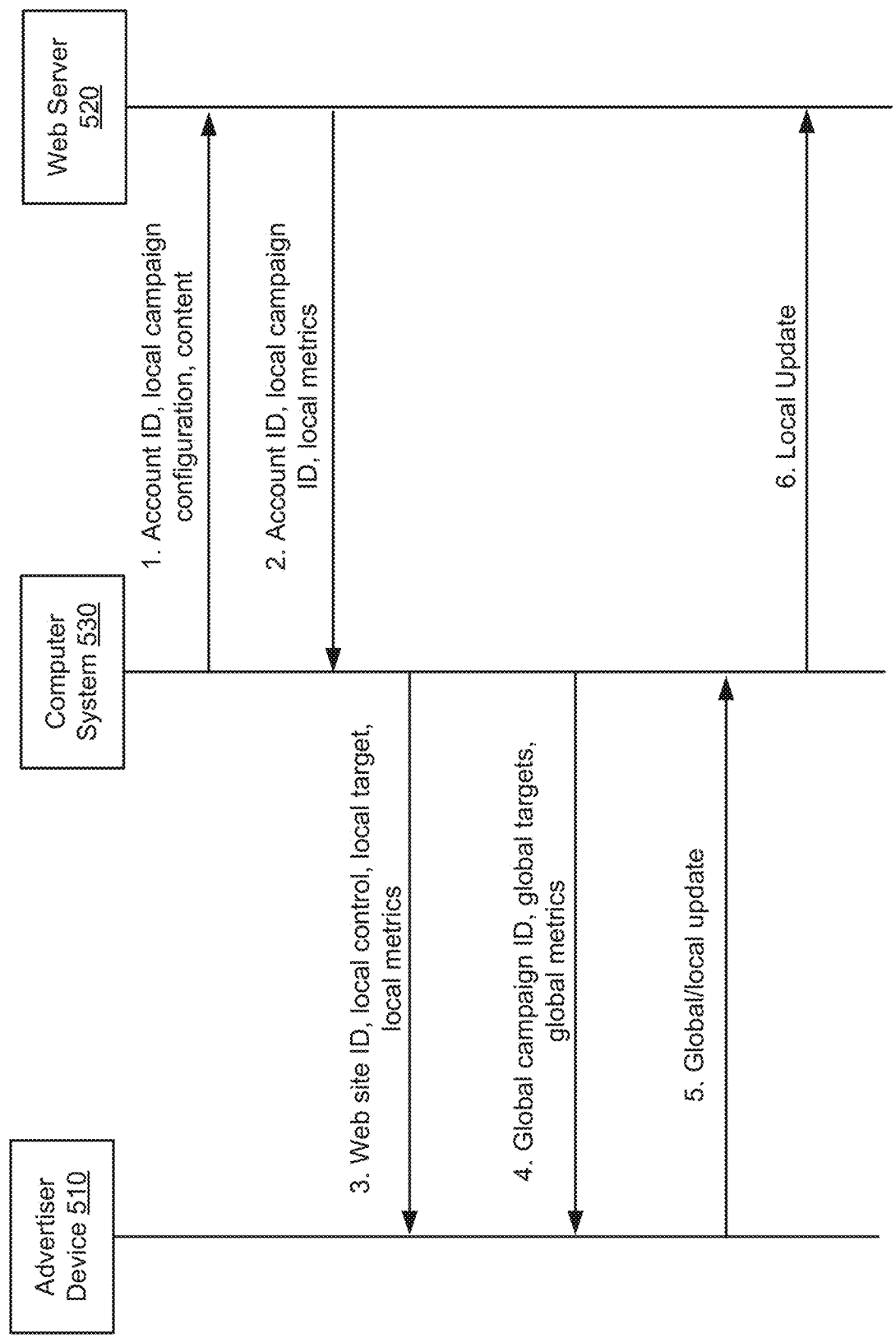
FIG. 5 illustrates an example a diagram for managing a campaign of content presentation between an advertiser device, a computer system, and a web server, according to embodiments of the present disclosure.

FIG. 5 illustrates an example a diagram for managing a campaign of content presentation between an advertiser device 510, a computer system 530, and a web server 520, according to embodiments of the present disclosure. As illustrated with the first step, the computer system 530 sends an account ID, a local campaign configuration, and content to a web server 520. The account ID is associated with the advertiser device 510. The local campaign configuration and the content are based on a campaign definition sent from the advertiser device 510 to the computer system 530.

The web server 520 sends the account ID, local campaign ID, and local metrics about the local campaign to the computer system 530 as illustrated with the second step. The local campaign ID uniquely identifies the local campaign configuration. The local metrics include performance metrics about the web server 520 presenting the content. The computer system 530 then sends the web site ID, local control, local target, and local metrics to the advertiser device 510 as illustrated with the third step. The web site ID, local control, local target, and local metrics are indicated via a GUI of the advertiser device 510. The computer system 530 also sends a global campaign ID, global targets, and global metrics to the advertiser device 510 as illustrated with the fourth step. The global campaign ID uniquely identifies a global campaign that the local campaign configuration is a part of. The global metrics are an aggregation of local metrics received from the web server 520 and other web servers that present the content associated with the global campaign. The advertiser device 510 then sends a global or local update to the computer system 530 as illustrated with the fifth step. The update can include an update to web sites or geographic regions that the content is to be presented in, an update to the global controls, or an update to the global targets. The computer system 530 sends a local update to the web server 520 as illustrated with the sixth step. The local update corresponds to the global/local update sent to the computer system 530 by the advertiser device 510 and may affect the local metrics that are collected by the web server 520.

Figure 6:
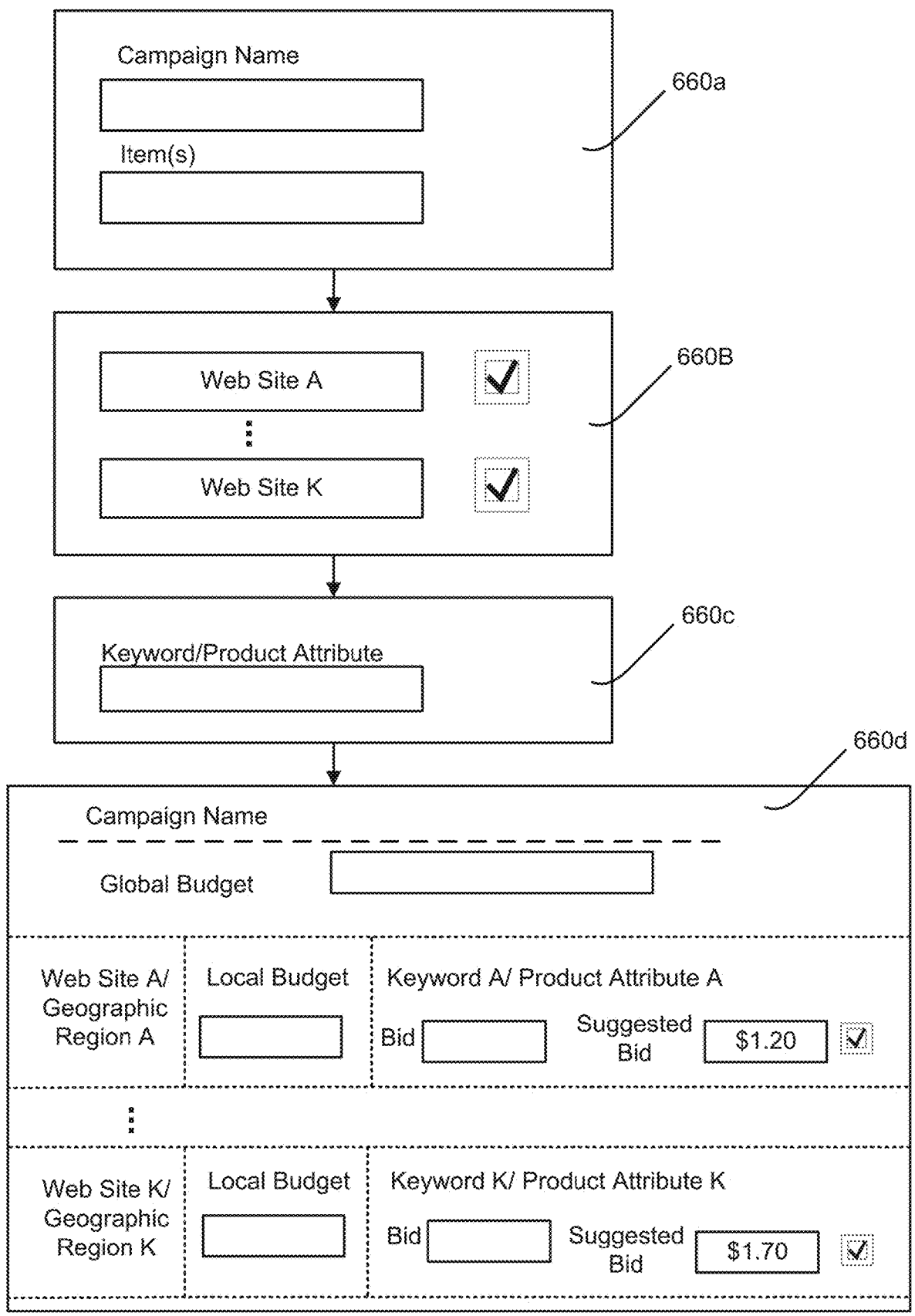
FIG. 6 illustrates examples of graphical user interfaces (GUIs) of an advertiser device throughout managing a campaign of content presentation, according to an embodiment of the present disclosure.

FIG. 6 illustrates examples of graphical user interfaces (GUIs) of an advertiser device throughout managing a campaign of content presentation, according to an embodiment of the present disclosure. A first GUI 660a represents where a user of the advertiser device indicates a campaign name and item(s) that are to be included in the campaign. The campaign name is a global campaign across one or more web sites, geographic regions, or marketplaces. Additionally, the campaign name may be used as an identifier of the campaign.

In an example, a second GUI 660b of the advertiser device indicates web sites (shown as web sites A through K) in which the content of the campaign are to be presented. The second GUI 660b may indicate web sites in which the selected item(s) are offered and unoffered and the web sites can be selectable by the user for being included in the campaign. As explained herein above, rather than or in addition to identifying web site, the GUI can identify marketplaces and/or geographical regions.

A third GUI 660c includes a location for a target for the campaign to be indicated. In some examples, the third GUI 660c may present suggested keywords or product attributes based on the item(s) indicated in the first GUI 660a. For example, multiple items may be indicated to be included in the campaign and a target can be generated based on item information about each of the multiple items in each web site in the selected web sites from the second GUI 660*b*. The target can then be suggested to a user via the third GUI 660*c*.

In an example, a fourth GUI 660*d* indicates the campaign name and a global control, such as a global budget, for the campaign. The fourth GUI 660*d* also indicates characteristics of each of the local campaigns associated with the campaign. For example, the fourth GUI 660*d* can indicate each web site or geographic region selected in the second GUI 660*b* and associated characteristics of each local campaign for the web sites and geographic regions. Local controls (e.g., local budget and bid) and a keyword and/or product attribute for the item(s) can be indicated via the fourth GUI 660*d*. Additionally, a suggested bid for each web site or geographic region can be indicated. The suggested bid can be based on web traffic associated with historical offerings of the item(s). A field of the fourth GUI 660*d* can indicate the item, the global control, the global target, and global metrics. A sub-field of the field can indicate the geographic region or selected web site, the local control, the local target, and the local metrics for the campaign.

Figure 7:
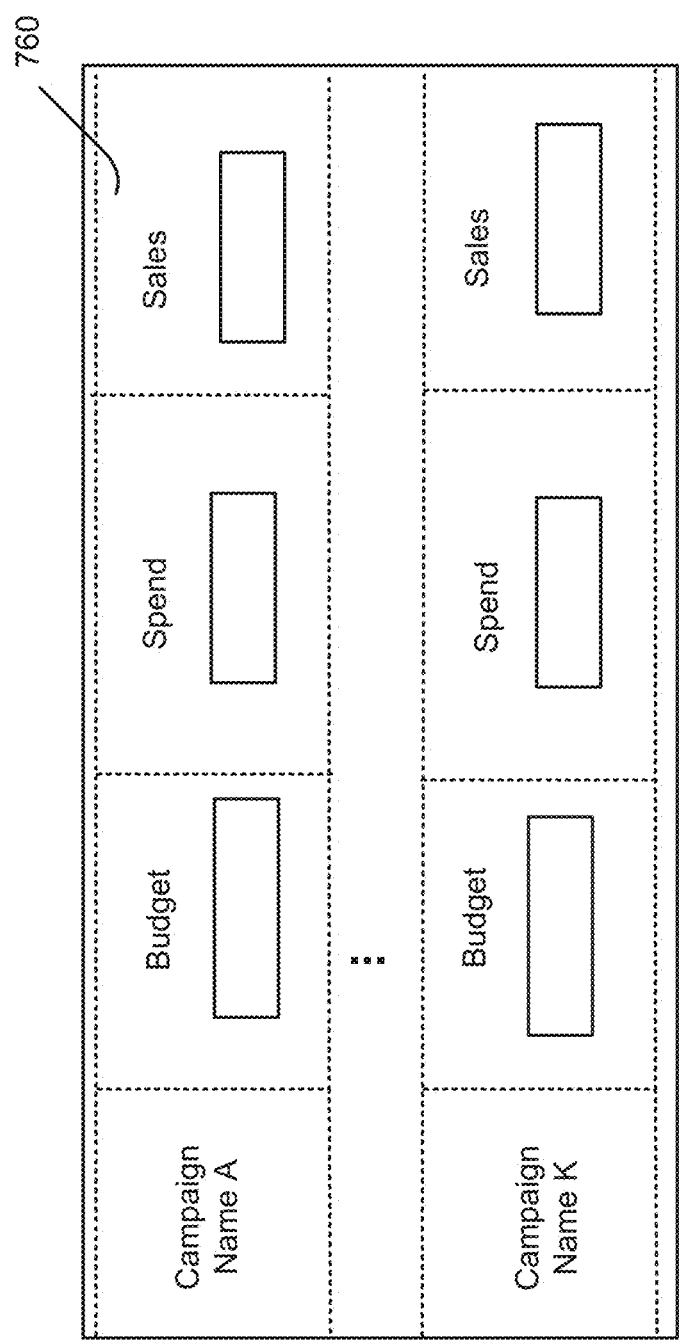
FIG. 7 illustrates another example of a graphical user interfaces (GUI) of an advertiser device for managing a campaign of content presentation, according to an embodiment of the present disclosure.

FIG. 7 illustrates another example of a graphical user interfaces (GUI) 760 of an advertiser device for managing a campaign of content presentation, according to an embodiment of the present disclosure. The GUI 760 may be presented subsequent to the third GUI 660*c* and prior to the fourth GUI 660*d* in FIG. 6. For example, the GUI 760 can be presented once a user defines the targets and controls for a global campaign. The GUI 760 can indicate each campaign associated with an account of the user. Additionally, the GUI 760 indicates characteristics, such as a budget, spend, and sales, for each of the campaigns. A user may select one of the campaigns, which can result in an expanded view of the campaign. The fourth GUI 660*d* is an example of an expanded view of a campaign.

Figure 8:
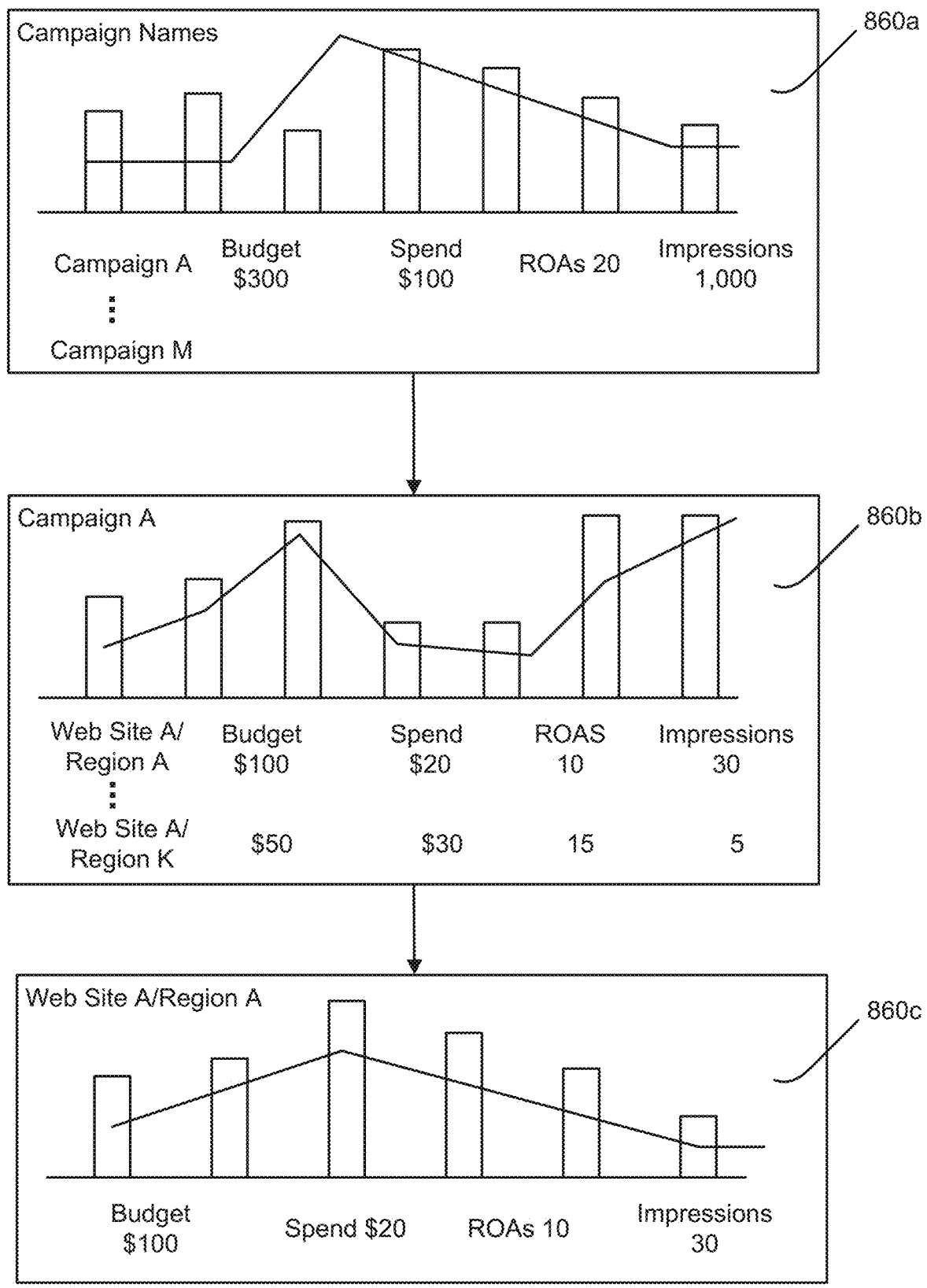
FIG. 8 illustrates an example of a graphical user interfaces (GUI) of an advertiser device indicating metrics associated with a campaign of content presentation, according to an embodiment of the present disclosure.

FIG. 8 illustrates an example of a graphical user interfaces (GUI) of an advertiser device indicating metrics associated with a campaign of content presentation, according to an embodiment of the present disclosure. A first GUI 860*a* can present overall metrics for campaigns associated with an account. For example, the metrics may show an amount spent for presenting content across multiple campaigns and an amount of sales from presenting the content across the multiple campaigns. A user can select a particular campaign, such as Campaign A, which can result in a second GUI 860*b* presenting metrics associated with the particular campaign. Additionally, the second GUI 860*b* can indicate web sites and/or regions associated with the particular campaign and corresponding local metrics. For example, the local metrics can include a local budget, a spend amount, an ROAS, and impressions for the particular web site and/or geographic region. The user can provide another selection for one of the web sites and/or geographic regions, which can result in the third GUI 860*c*. The third GUI 860*c* presents the local metrics for the selected web site and/or geographic region. The local metrics indicated in the third GUI 860*c* can be indicated in real-time relative to the advertiser device receiving the local metrics.

FIGS. 9-14 illustrate processes associated with managing a campaign of content presentation, according to an embodiment of the present disclosure. Some or all of the processes (or any other processes described herein, or variations, and/or combinations thereof) may be performed under the control of one or more computer systems, such as the computer system 130 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 9:
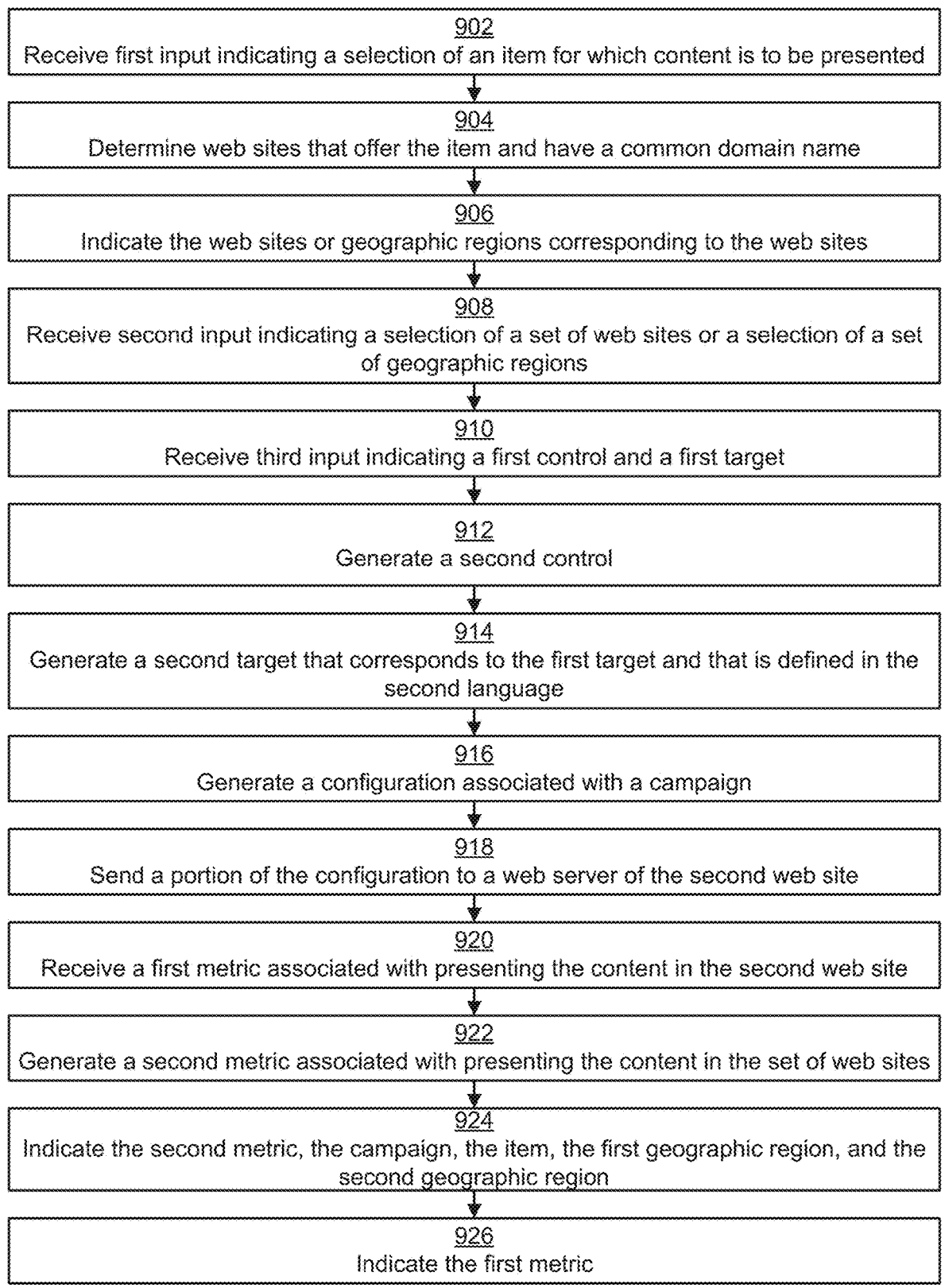
FIG. 9 illustrates an example of a flow for an overall process of managing a campaign of content presentation, according to an embodiment of the present disclosure.

FIG. 9 illustrates an example of a flow for an overall process of managing a campaign of content presentation, according to an embodiment of the present disclosure. In an example, the flow includes operation 902, where the computer system receives first input indicating a selection of an item for which content is to be presented. The computer system receives the first input via a GUI at a device (e.g., advertiser device 110 in FIG. 1) that is associated with an account identifier. The content may be an advertisement for the item.

In an example, the flow includes operation 904, where the computer system determines web sites that offer the item and have a common domain name. Each of the web sites may present item information in different languages. For example, a first web site can present first item information in a first language of a first geographic region and a second web site can present second item information in a second language of a second geographic region.

In an example, the flow includes operation 906, where the computer system indicates the web sites or geographic regions corresponding to the web sites. The second input is received via the GUI.

In an example, the flow includes operation 908, where the computer system receives second input indicating a selection of a set of web sites or a selection of a set of geographic regions. The set of web sites includes the first web site and the second web site. The selection is received via the GUI and indicates the web sites or the set of geographic regions in which the content is to be presented.

In an example, the flow includes operation 910, where the computer system receives third input indicating a first control and a first target. The third input is received via the GUI. For instance, the first control includes a first budget defined in a currency of the first geographic region. Additionally, the first target is defined in the first language and includes at least one of a keyword or an item attribute associated with the item.

In an example, the flow includes operation 912, where the computer system generates a second control. The second control is based on the first control and includes a second budget associated with presenting the content in the second web site. For instance, the second control is defined in the currency of the second geographic region.

In an example, the flow includes operation 914, where the computer system generates a second target that corresponds to the first target and that is defined in the second language. For example, a semantic model may translate the first target into the second language, and the translation can correspond to the second target.

In an example, the flow includes operation 916, where the computer system generates a configuration associated with a campaign. The campaign is for presenting the content in the set of web sites. The configuration includes the account identifier, a campaign identifier of the campaign, a web site identifier of each web site in the set, the first control, the second control, the first target, and the second target.

In an example, the flow includes operation 918, where the computer system sends a portion of the configuration to a web server of the second web site. The portion of the configuration can be a local campaign configuration. The computer system sends the portion of the configuration to the web server via an API. The portion of the configuration includes the account identifier, the campaign identifier, the web site identifier of the second web site, the second control, and the second target.

In an example, the flow includes operation 920, where the computer system receives a first metric associated with presenting the content in the second web site. The first metric is received from the web server via the API. The first metric can include impressions, ROAs, sales, etc. associated with presenting the content in the second web site.

In an example, the flow includes operation 922, where the computer system generates a second metric associated with presenting the content in the set of web sites. The computer system can aggregate the first metric with metrics received from the other web sites in the set of web sites to generate the second metric.

In an example, the flow includes operation 924, where the computer system indicates the second metric, the campaign, the item, the first geographic region, and the second geographic region. These factors are indicated via the GUI.

In an example, the flow includes operation 926, where the computer system indicates the first metric. The computer system indicates the first metric via the GUI based on fourth input selecting the second geographic region. Additionally, the portion of the configuration can be indicated via the GUI, which can identify the second geographic region, the second control, the second target, and the second metric in response to the selection of the second geographic region.

Figure 10:
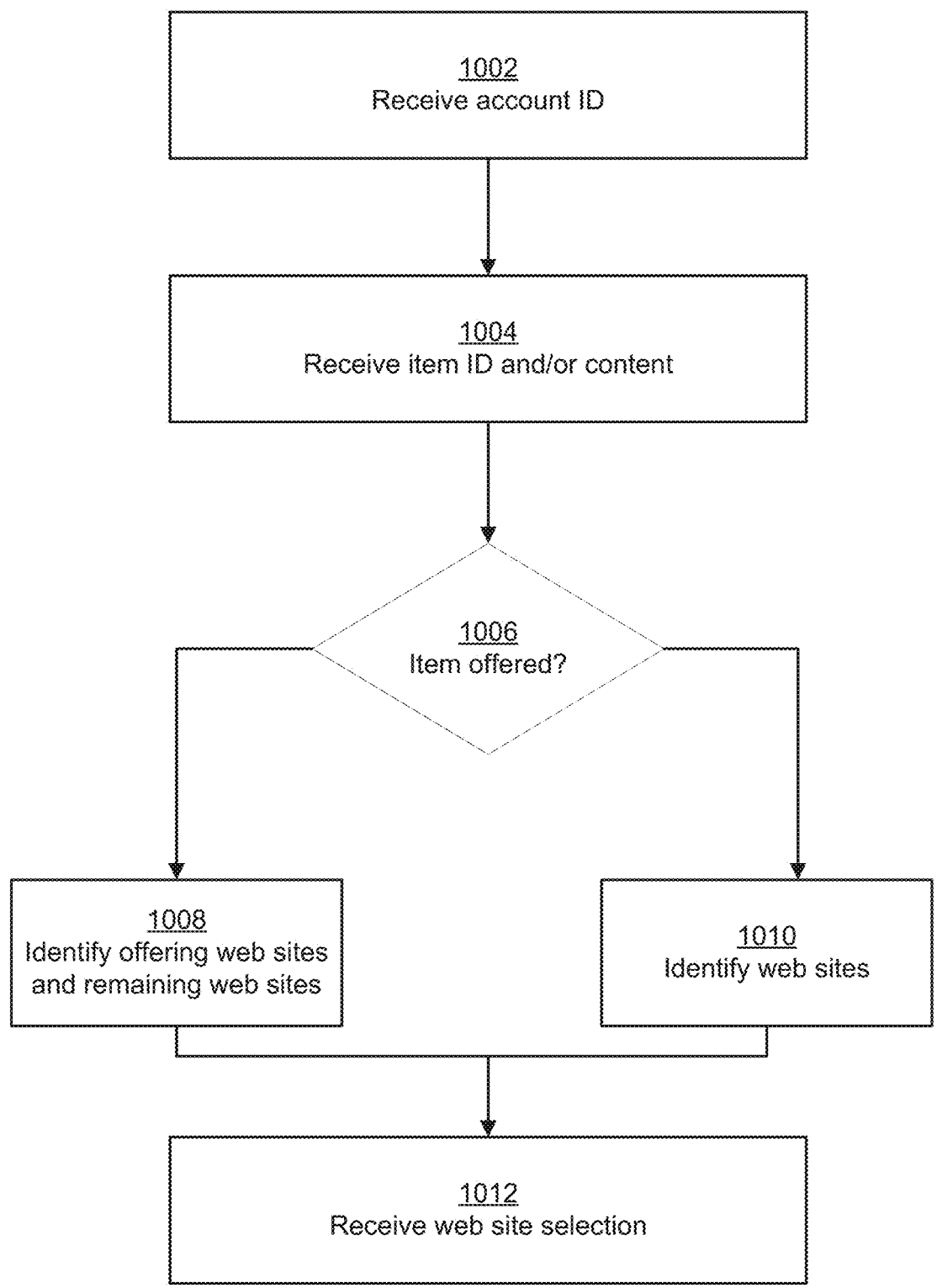
FIG. 10 illustrates an example of a flow for selecting web sites for a campaign of content presentation, according to an embodiment of the present disclosure.

FIG. 10 illustrates an example of a flow for selecting web sites for a campaign of content presentation, according to an embodiment of the present disclosure. In an example, the flow includes operation 1002, where the computer system receives an account ID. The account ID is associated with a device identifying content that is to be presented.

In an example, the flow includes operation 1004, where the computer system receives an item ID and/or content. The item ID identifies an item for which the content is to be presented.

In an example, the flow includes operation 1006, where the computer system determines whether an item is offered. The computer system may determine web sites and/or geographic regions in which the item is offered. The flow may proceed in multiple ways, depending on a configuration of the GUI. A first way corresponds to operation 1008 and a second way corresponds to operation 1010.

In an example, the flow includes operation 1008, where the computer system identifies offering web sites and remaining web sites. Based on the determination in operation 1006, the computer system can identify web sites that offer the item and web sites that do not offer the item. The web sites and their corresponding offering status are indicated via the GUI.

In an example, the flow includes operation 1010, where the computer system identifies web sites. Rather than indicating which web sites offer the item and which web sites do not offer the item, the computer system may simply indicate web sites for presenting the content via the GUI.

In an example, the flow includes operation 1012, where the computer system receives a web site selection. The web site selection can be received via the GUI and can indicate the web sites in which the content is to be presented. For example, a user can select some or all of the web sites identified in operations 1008 and 1010.

Figure 11:
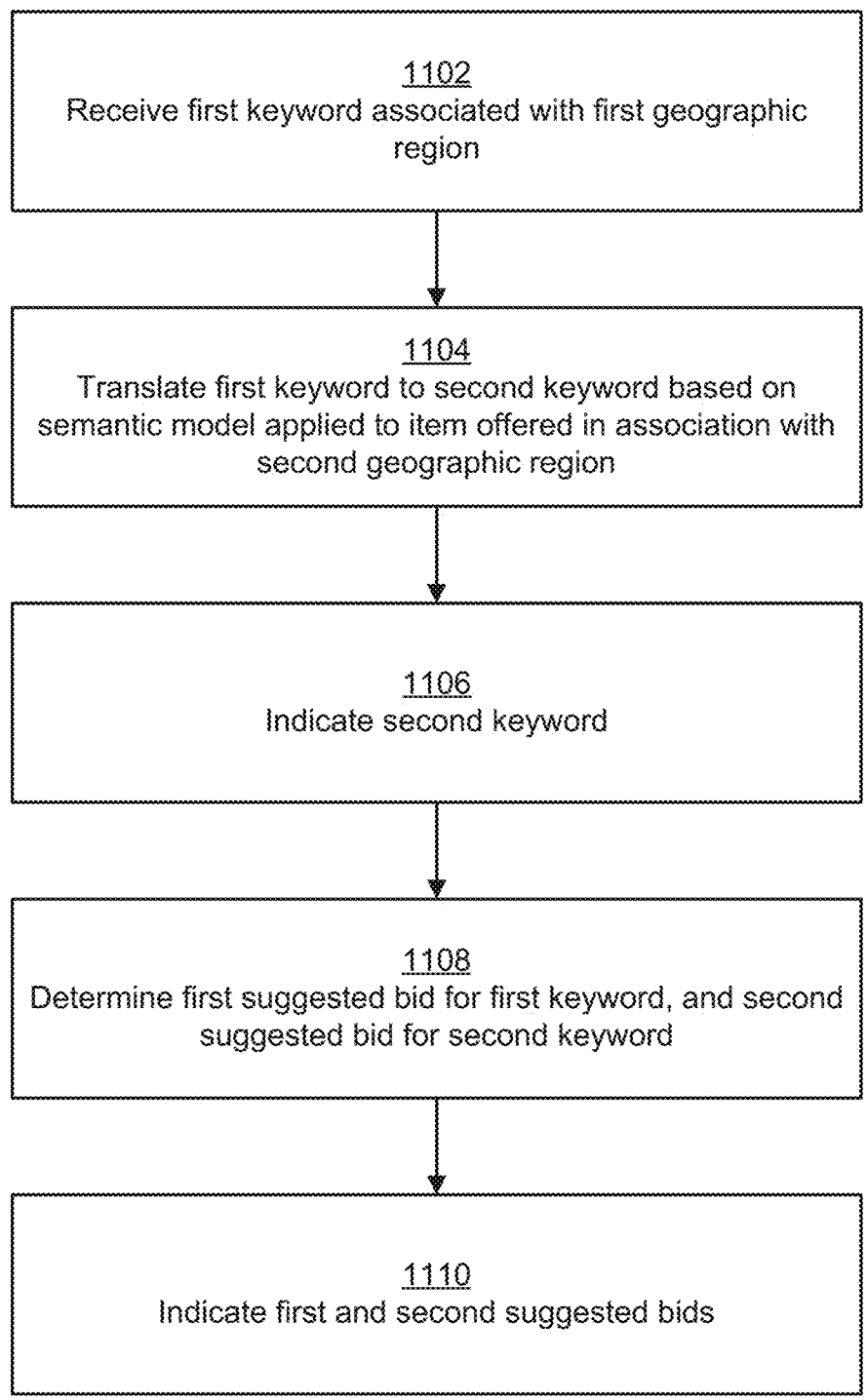
FIG. 11 illustrates an example of a flow for generating suggested bids for a campaign of content presentation based on a keyword, according to an embodiment of the present disclosure.

FIG. 11 illustrates an example of a flow for generating suggested bids for a campaign of content presentation based on a keyword, according to an embodiment of the present disclosure. In an example, the flow includes operation 1102, where the computer system receives a first keyword associated with a first geographic region. For example, the first keyword can be in a first language associated with the first geographic region. The first keyword is received via a GUI of a device associated with defining a campaign.

In an example, the flow includes operation 1104, where the computer system translates the first keyword to a second keyword based on a semantic model applied to the item offered in association with the second geographic region. For example, the computer system can translate the first keyword of "scary books" in the first language of English to "libros de miedo" in the second language of Spanish. The translation uses a semantic model, such as BERT. This model can be trained on web page content of items offered in different marketplaces. As such, the translation of a keyword from a first marketplace to a second marketplace results in a semantic translation that is based on at least the second marketplace.

In an example, the flow includes operation 1106, where the computer system indicates the second keyword. The second keyword is indicated via the GUI of the device.

In an example, the flow includes operation 1108, where the computer system determines a first suggested bid for the first keyword and a second suggested bid for the second keyword. The computer system determines the first suggested bid based at least in part on first web traffic associated with a set of web sites selected to present content of the campaign. The computer system determines the second suggested based at least in part on second web traffic associated with a selected web site of the set of web sites.

In an example, the flow includes operation 1110, where the computer system indicates the first and second suggested bids. The computer system indicates the first and second suggested bids via the GUI. The first suggested bid may be indicated along with the first geographic region and the second suggested bid may be presented along with the second geographic region. The first and second suggested bids are selectable by a user via the GUI for defining controls of the campaign.

Figure 12:
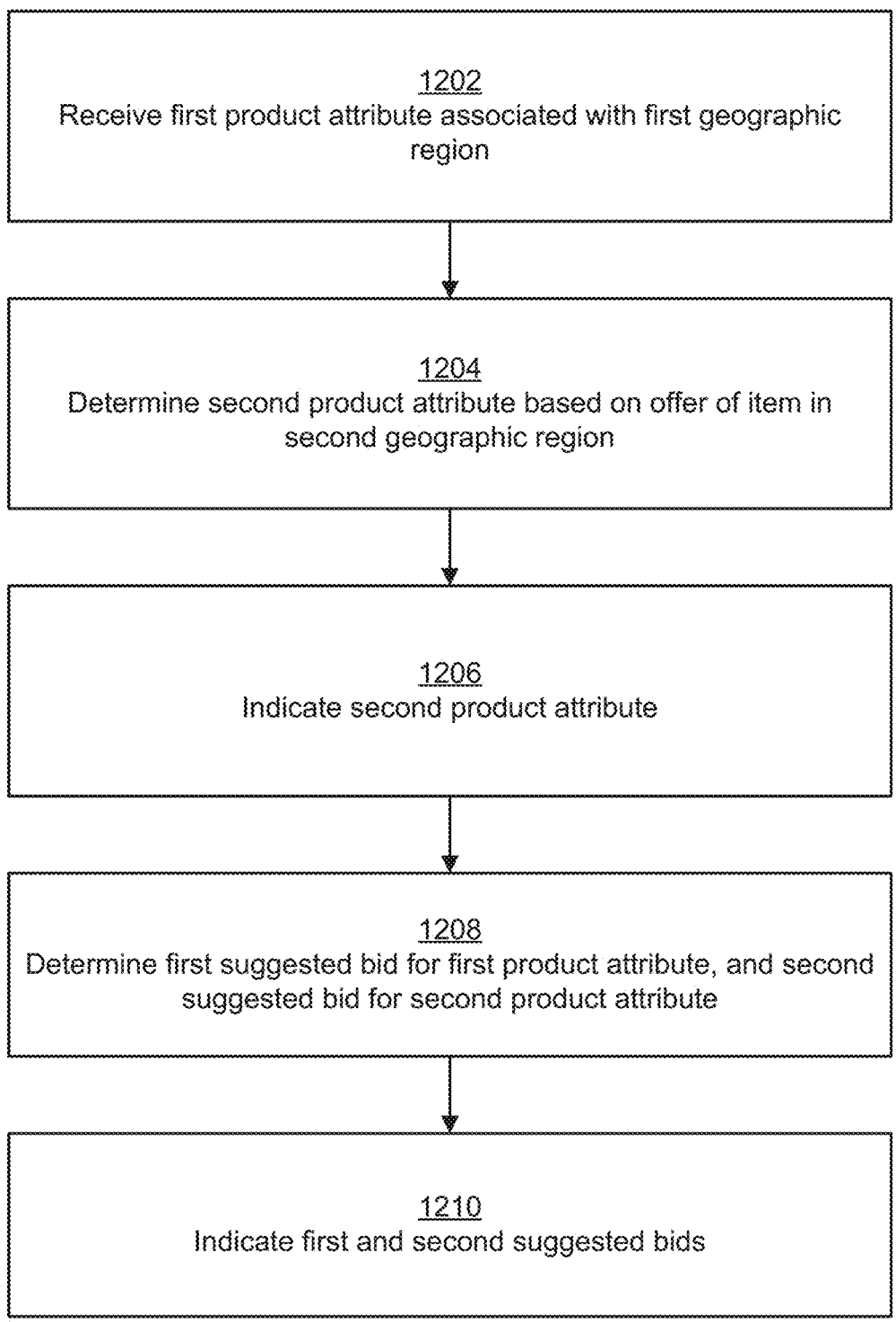
FIG. 12 illustrates an example of a flow for generating suggested bids for a campaign of content presentation based on a product attribute, according to an embodiment of the present disclosure.

FIG. 12 illustrates an example of a flow for generating suggested bids for a campaign of content presentation based on a product attribute, according to an embodiment of the present disclosure. In an example, the flow includes operation 1202, where the computer system receives a first product attribute associated with a first geographic region. For instance, an item and a first marketplace are identified via a GUI. The computer system can determine a web page of the marketplace, where this web page offers the item. The attribute can be determined from the web page as being a listed property of the item and/or a property of the offer. If multiple attributes are possible, these attributes can be indicated via the GUI and a selection of the first attribute can be received back.

In an example, the flow includes operation 1204, where the computer system determines a second product attribute based on an offer of the item in a second geographic region. The second product attribute corresponds to the first item product attribute. For instance, the computer system determines similar items that are offered in the first marketplace (e.g., items that belong to the same category, items that have the same serial number, items that have the similar attributes but offered by different merchants, etc.). The computer system also determines web pages of a second marketplace that offer these items. The first attribute can be matched (e.g., by a semantic model) with a second attribute from attributes listed in the web pages.

In an example, the flow includes operation 1206, where the computer system indicates the second product attribute. The second keyword is indicated via the GUI of the device.

In an example, the flow includes operation 1208, where the computer system determines a first suggested bid for the first product attribute and a second suggested bid for the second product attribute. The computer system determines the first suggested bid based at least in part on first web traffic associated with a set of web sites selected to present content of the campaign. The computer system determines the second suggested based at least in part on second web traffic associated with a selected web site of the set of web sites.

In an example, the flow includes operation 1210, where the computer system indicates the first and second suggested bids. The computer system indicates the first and second suggested bids via the GUI. The first suggested bid may be indicated along with the first geographic region and the second suggested bid may be presented along with the second geographic region. The first and second suggested bids are selectable by a user via the GUI for defining controls of the campaign.

Figure 13:
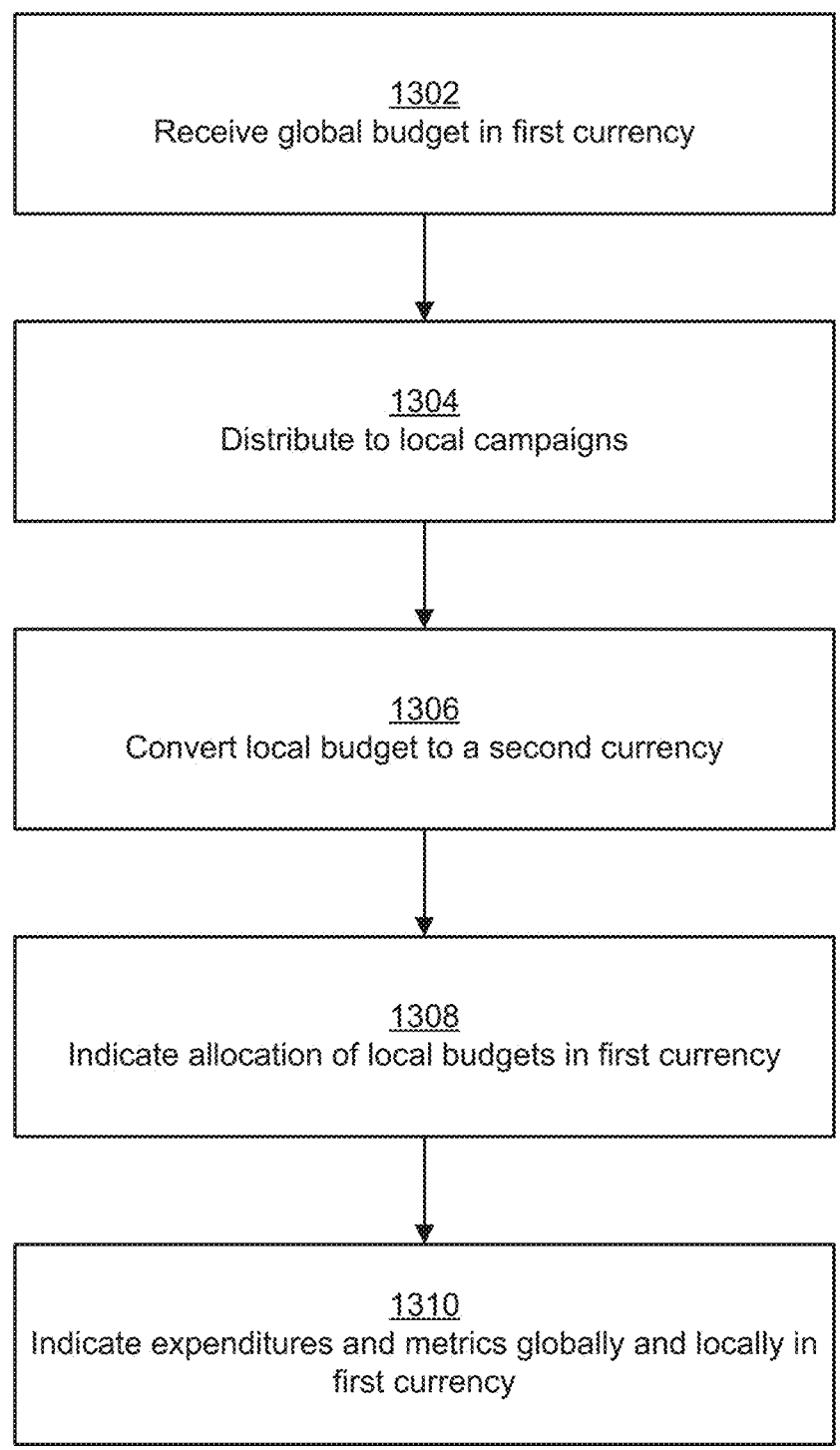
FIG. 13 illustrates an example of a flow for setting and visualizing monetary aspects of a campaign of content presentation, according to an embodiment of the present disclosure.

FIG. 13 illustrates an example of a flow for setting and visualizing monetary aspects of a campaign of content presentation, according to an embodiment of the present disclosure. In an example, the flow includes operation 1302, where the computer system receives a global budget in a first currency. The computer system receives the global budget via a GUI of a device associated with a campaign for content presentation. The global budget is the budget associated with the campaign across multiple web sites, geographic regions, or marketplaces.

In an example, the flow includes operation 1304, where the computer system distributes the global budget to local campaigns. The computer system may evenly distribute the global budget to each local campaign. Alternatively, the computer system may distribute the budget based on previous performance of local campaigns in each web site, geographic region, or marketplace. For example, a higher budget can be distributed to a web site that historically has more sales or impressions for a campaign. In some examples, the computer system can receive an indication from a user about how the global budget is to be distributed.

In an example, the flow includes operation 1306, where the computer system converts the local budget to a second currency. The computer system converts each local budget to the currency associated with the geographic region of the local campaign. For example, if a local campaign is for the United Kingdom and the global budget is received in US dollars, the computer system can convert the local budget for the United Kingdom into pounds.

In an example, the flow includes operation 1308, where the computer system indicates the allocation of the local budgets in the first currency. The computer system indicates each of the local budgets via the GUI using the first currency of the global budget. In this way, the each of the local budgets can be easily compared to each other without any additional conversions.

In an example, the flow includes operation 1310, where the computer system indicates expenditures and metrics globally and locally in the first currency. The computer system receives the expenditures and metrics throughout the presentation of the content in each of the local currencies. The computer system converts the expenditures and metrics for each local campaign into the first currency of the global budget and then indicates the expenditures and metrics globally and locally via the GUI in the first currency.

Figure 14:
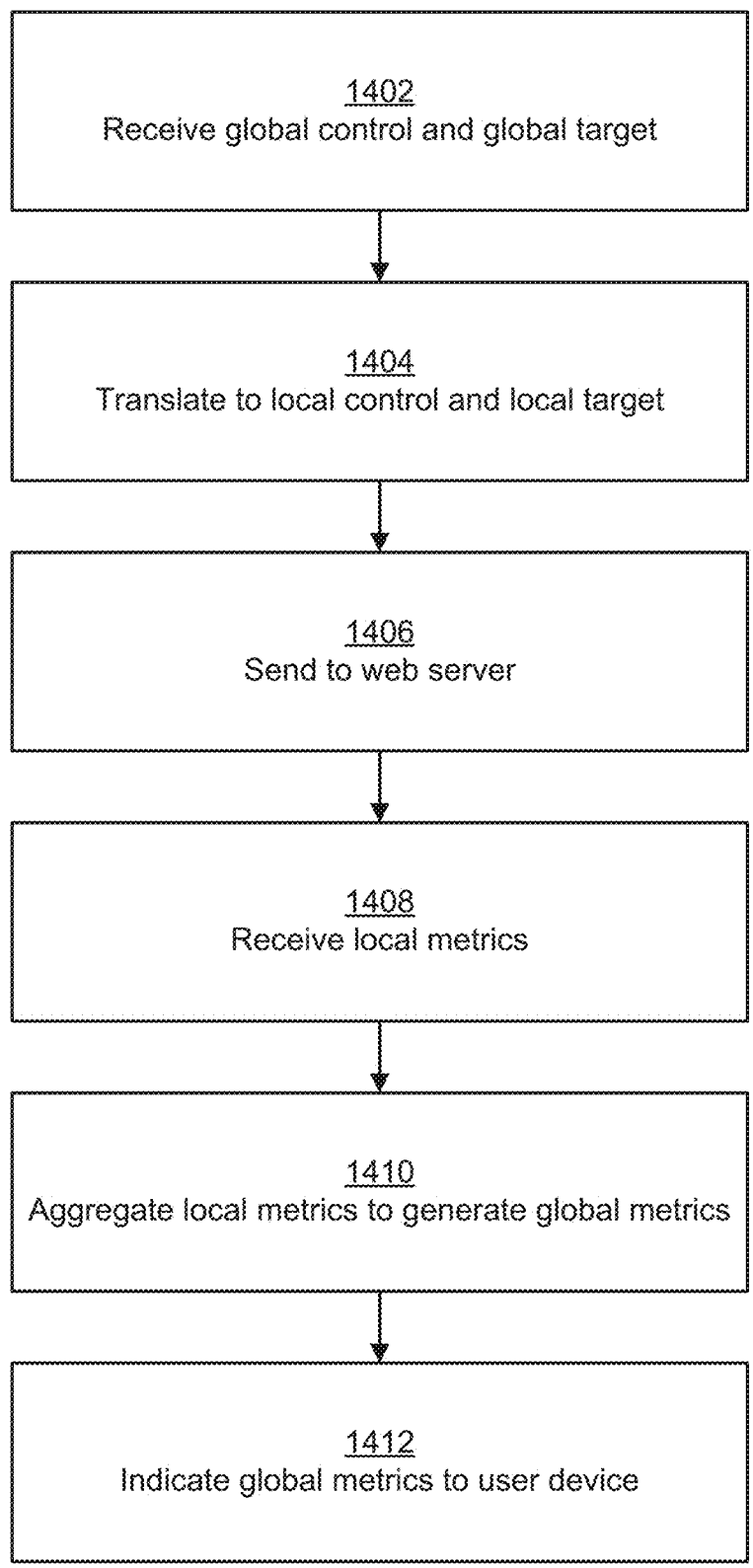
FIG. 14 illustrates an example of a flow for indicating metrics of a campaign of content presentation, according to an embodiment of the present disclosure.

FIG. 14 illustrates an example of a flow for indicating metrics of a campaign of content presentation, according to an embodiment of the present disclosure. In an example, the flow includes operation 1402, where the computer system receives a global control and a global target. For example the global control can be a global budget for a campaign and the global target can be a keyword or item attribute associated with the item in the campaign.

In an example, the flow includes operation 1404, where the computer system translates the global control and the global target to a local control and a local target. The global control can be distributed to each web site or geographic region included in the campaign, and the local target can be a local budget derived from the global budget for one of the web sites or geographic regions. The local target can be the global target translated into a language associated with the web site or geographic region of the local campaign. The computer system may use a semantic model to translate the global target to the local target.

In an example, the flow includes operation 1406, where the computer system sends a portion of a configuration of the campaign to a web server. The portion of the configuration includes an account ID of an account associated with the campaign, a campaign ID identifying the campaign, a web site ID associated with the local campaign, the local control, and the local target. The computer system sends the portion of the configuration via an API.

In an example, the flow includes operation 1408, where the computer system receives local metrics. The local metrics are received from each web server associated with a local campaign. The local metrics are indicated in a currency associated with the geographic region of the local campaign. The local metrics indicate a performance of each local campaign.

In an example, the flow includes operation 1410, where the computer system aggregates the local metrics to generate global metrics. The computer system can convert the currencies of the local metrics into a global currency associated with the global campaign. A campaign metrics aggregator (e.g., campaign metrics aggregator 122 in FIG. 1) can aggregate the local metrics to generate the global metrics.

In an example, the flow includes operation 1412, where the computer system indicates the global metrics to the user device. The global metrics are indicated in the currency associated with the global campaign. The global metrics allow a user to compare each local campaign relative to each other and to analyze the global campaign as a whole.

Figure 15:
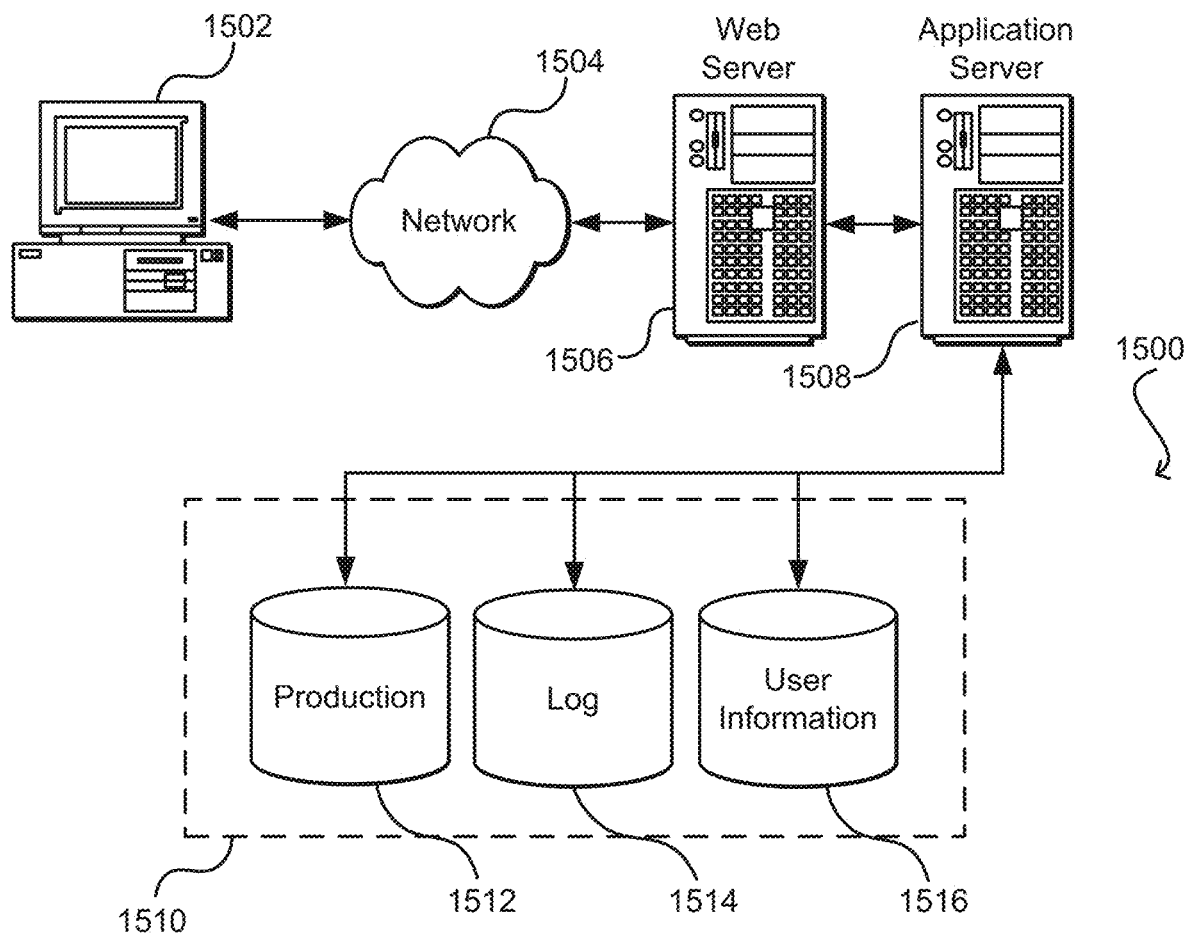
FIG. 15 illustrates an environment in which various embodiments can be implemented.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing production data 1512 and user information 1516, which can be used to serve content for the production side. The data store also is shown to include a mechanism for storing log data 1514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system comprising:
one or more processors; and
one or more memories storing instructions that, upon execution by the one or more processors, configure the computer system to:
receive, via graphical user interface (GUI) at a device that is associated with an account identifier, first input indicating a selection of an item for which content is to be presented;
determine a plurality of web sites that offer the item and that have a common domain name, a first web site of the plurality of web sites presenting first item information in a first language of a first geographic region, a second web site of the plurality of web sites presenting second item information in a second language of a second geographic region;
indicate, via the GUI, the plurality of web sites or a plurality of geographic regions each corresponding to one of the plurality of web sites;
receive, via the GUI, second input indicating a selection of a set of web sites from the plurality of web sites or a selection of a set of geographic regions that correspond to the set of web sites, the set of web sites comprising the first web site and the second web site;
receive, via the GUI, third input indicating a first control and a first target associated with presenting the content in the set of web sites, the first control comprising a first budget defined in a currency of the first geographic region, the first target defined in the first language and comprising at least one of a keyword or an item attribute;
generate, based at least in part on the first control, a second control that comprises a second budget associated with presenting the content in the second web site and defined in the currency of the second geographic region;
generate a second target that corresponds to the first target and that is defined in the second language;
generate a configuration associated with a campaign for presenting the content in the set of web sites, the configuration comprising the account identifier, a campaign identifier of the campaign, a web site identifier of each web site of the set, the first control, the second control, the first target, and the second target;
send, via an application programming interface (API), a portion of the configuration to a web server of the second web site, the portion comprising the account identifier, the campaign identifier, the web site identifier of the second web site, the second control, and the second target;
receive, via the API, a first metric associated with presenting, based at least in part on the portion, the content in the second web site;
generate a second metric associated with presenting, based at least in part on the configuration, the content in the set of web sites, the second metric generated based at least in part on the first metric;
indicate, via the GUI, the second metric, the campaign, the item, the first geographic region, and the second geographic region; and
indicate, via the GUI, the first metric based at least in part on fourth input selecting the second geographic region.

2. The computer system of claim 1, wherein the one or more memories store further instructions that, upon execution by the one or more processors, configure the computer system to:
indicate, via the GUI, the configuration, wherein the GUI is configured to identify the campaign, the first control, the first target, the second metric, a total number of selected geographic regions; and
indicate via the GUI in response to a selection of the second geographic region, the portion of the configuration, wherein the GUI is configured to identify the second geographic region, the second control, the second target, and the second metric.

3. The computer system of claim 1, wherein the one or more memories store further instructions that, upon execution by the one or more processors, configure the computer system to:
receive, via the GUI, an update to the campaign, the update comprising at least one of: an addition or removal of a geographic region from the set of geographic regions, an edit to the first control, or an edit to the first target;
generate a change to the portion of the configuration based at least in part on the update, the change comprising at least one of: an edit to the second control or an edit to the second target; and
send the change to the web server.

4. The computer system of claim 1, wherein the one or more memories store further instructions that, upon execution by the one or more processors, configure the computer system to:
receive, via the GUI, an update to the portion of the configuration, the update comprising at least one of: an edit to the second control or an edit to the second target; and
send the update to the web server, wherein another portion of the configuration associated with the first geographic region remains unchanged.

5. A computer-implemented method, comprising:
determining whether an item for which content is to be presented is offered at a plurality of web sites;
indicating, via a graphical user interface (GUI) at a device associated with an account identifier, the plurality of web sites;
receiving, via the GUI, input indicating a selection of a set of web sites of the plurality of web sites;
receiving, via the GUI, a first control and a first target associated with presenting the content in the set of web sites;
generating a second control based at least in part on the first control, the second control associated with presenting the content in a selected web site of the set of web sites;
generating a second target associated with presenting the content in the selected web site;
indicating, via the GUI, the selected web site or a geographic region associated with the selected web site, the second control, and the second target;
indicating, via the GUI, a first metric associated with presenting the content in the web sites based at least in part on the first control and the first target; and
indicating, via the GUI, the selected web site or the geographic region and a second metric associated with presenting the content in the selected web site based at least in part on the second control and the second target.

6. The computer-implemented method of claim 5, further comprising:
generating a configuration associated with presenting the content in the set of web sites, the configuration comprising the account identifier, an identifier associated with each web site of the set, the first control, the second control, the first target, and the second target; and
sending, via an application programming interface (API), a portion of the configuration to a web server of the selected web site, the portion comprising the account identifier, the identifier associated with the selected web site, the second control, and the second target.

7. The computer-implemented method of claim 6, further comprising:
receiving, via the API, the second metric; and
indicating, via the GUI, the second metric in real-time relative to the second metric being received and along with the identifier associated with the selected web site and an identifier associated with the set of web sites.

8. The computer-implemented method of claim 6, further comprising:
receiving, via the API, the second metric;
generating the first metric based at least in part on the second metric and on another metric received from another web server; and
indicating, via the GUI, the first metric along with an identifier associated with the set of web sites and with an option to present the second metric of the selected web site.

9. The computer-implemented method of claim 5, further comprising:
indicating, via the GUI and based at least in part on a determination that the item is offered at the plurality of web sites and unoffered in a particular web site, that the plurality of web sites and the particular web site are individually selectable along with the determination.

10. The computer-implemented method of claim 5, wherein the geographic region is a second geographic region, wherein the first target comprises a first keyword defined in a first language associated with a first geographic region, and further comprising:
generating a second keyword that corresponds to the first keyword and in a language associated with the second geographic region, wherein the second target comprises the second keyword; and
indicating, via the GUI, the first keyword along with the first geographic region and the second keyword along with the second geographic region.

11. The computer-implemented method of claim 5, wherein the geographic region is a second geographic region, wherein the first target comprises a first item attribute defined based at least in part on a first offer of the item in a first web site of the plurality of web sites, and further comprising:
generating a second item attribute that corresponds to the first item attribute, wherein the second target comprises the second item attribute, and wherein the second item attribute is determined based at least in part on a second offer of the item in the selected web site; and
indicating, via the GUI, the first item attribute along with a first geographic region and the second item attribute along with the second geographic region.

12. The computer-implemented method of claim 5, wherein the geographic region is a second geographic region, and further comprising:
determining a first suggested bid for a keyword or an item attribute, wherein the first suggested bid is determined based at least in part on first web traffic associated with the set of web sites, wherein the first control comprises the first suggested bid;
determining a second suggested bid for the keyword or the item attribute, wherein the second suggested bid is determined based at least in part on second web traffic associated with the selected web site, wherein the second control comprises the second suggested bid; and
indicating, via the GUI, the first suggested bid along with a first geographic region and the second suggested bid along with the second geographic region.

13. The computer-implemented method of claim 5, wherein the geographic region is a second geographic region, and further comprising:
receiving, via the GUI, an indication of a first budget associated with presenting the content in the set of web sites, the indication using a first currency associated with a first geographic region;
determining a second budget associated with presenting the content in the selected web site, wherein the second budget is allocated from the first budget and having a first value that uses the first currency and a second value that uses a second currency, wherein the second currency is associated with the second geographic region; and
indicating, via the GUI, the first budget using the first currency along with the first geographic region and the second budget using the first currency along with the second geographic region.

14. One or more non-transitory computer-readable storage media storing instructions that, upon execution on a computer system, cause the computer system to perform operations comprising:
determining whether an item for which content is to be presented is offered at a plurality of web sites;
indicating, via a graphical user interface (GUI) at a device associated with an account identifier, the plurality of web sites;
receiving, via the GUI, input indicating a selection of a set of web sites of the plurality of web sites;
receiving, via the GUI, a first control and a first target associated with presenting the content in the set of web sites;
generating a second control based at least in part on the first control, the second control associated with presenting the content in a selected web site of the set of web sites;
generating a second target associated with presenting the content in the selected web site;
indicating, via the GUI, the selected web site or a geographical region associated with the selected web site, the second control, and the second target;
indicating, via the GUI, a first metric associated with presenting the content in the web sites based at least in part on the first control and the first target; and
indicating, via the GUI, the selected web site or the geographical region and a second metric associated with presenting the content in the selected web site based at least in part on the second control and the second target.

15. The one or more non-transitory computer-readable storage media of claim 14, storing further instructions that, upon execution on the computer system, cause the computer system to perform additional operations comprising:

generating a configuration associated with presenting the content in the set of web sites, wherein the configuration comprises a hierarchy indicating the account identifier, an identifier associated with the set of web sites, and an identifier associated with each web site of the set, the first control, the second control, the first target, and the second target.

16. The one or more non-transitory computer-readable storage media of claim 15, storing additional instructions that, upon execution on the computer system, cause the computer system to perform further operations comprising:

sending, via an application programming interface (API), a portion of the configuration to a web server of the selected web site, wherein the portion comprising the account identifier, the identifier associated with the selected web site, the second control, and the second target.

17. The one or more non-transitory computer-readable storage media of claim 14, wherein the content is associated with a plurality of items, and storing further instructions that, upon execution on the computer system, cause the computer system to perform additional operations comprising:

receiving, via the GUI, a selection of the plurality of items;

generating the first target based at least in part on item information about each item of the plurality of items in each web site in the set of the web sites; and indicating, via the GUI, the first target along with the plurality of items.

18. The one or more non-transitory computer-readable storage media of claim 17, storing additional instructions that, upon execution on the computer system, cause the computer system to perform further operations comprising:

determining metrics associated with web traffic to a plurality of web pages each presenting item information about one of the plurality of items, wherein the web traffic is based at least in part on presenting the content in the set of web sites; and indicating, via the GUI, the metrics along with the first target and the plurality of items.

19. The one or more non-transitory computer-readable storage media of claim 14, storing further instructions that, upon execution on the computer system, cause the computer system to perform additional operations comprising:

indicating, via the GUI, the item, the first control, the first target, and the first metric in a field; and indicating, via the GUI, the geographic region or the selected web site, the second control, the second target, and the second metric in a sub-field of the field.

20. The one or more non-transitory computer-readable storage media of claim 19, storing additional instructions that, upon execution on the computer system, cause the computer system to perform further operations comprising:

generating a configuration associated with presenting the content in the set of web sites;

receiving, via the GUI, an update based at least in part on an input at the field or the sub-field; and generating a change to the configuration based at least in part on the update.

\* \* \* \* \*